3,435,079
FLUORODINITROMETHANE AND PREPARATION OF HALODINITROMETHANES

Horst G. Adolph and Mortimer J. Kamlet, Silver Spring, Md., assignors to the United States of America as represented by the Secretary of the Navy
No Drawing. Filed Mar. 31, 1964, Ser. No. 357,018
Int. Cl. C07c 79/12
U.S. Cl. 260—644
9 Claims The invention described herein may be manufactured and used by or for the Government of the United States of America for governmental purposes without the payment of any royalties theeron or therefor.

This invention relates to the preparation of useful synthetic intermediates. More particularly, this invention is concerned with the preparation of halodinitromethanes.

SYNOPSIS OF THE INVENTION

It has been found that halodinitromethanes may be prepared by the deformylation of the next higher homologous alcohol, such as a halodinitroethyl alcohol, with a strong base. In substance, the preparation of halodinitromethanes in accordance with this invention comprises:

(1) Conversion of halodinitroethanol to a salt by the action of a strong base;
(2) Separation of the salt so obtained from the formaldehyde generated therewith; and
(3) Liberation of the free halodinitromethane from the salt.

MATERIALS

In the preparation of the halodinitromethanes of this invention, such as fluorodinitromethane and the corresponding chloro- and bromo-compounds, the homologous halodinitro alcohols such as fluorodinitroethanol and the corresponding chloro- and bromo-derivatives are utilized as starting materials.

The strong base which is added to the halodinitroethyl alcohol is preferably potassium hydroxide in methanol solution although solutions of other strong bases such as other akali metal hydroxides or alkoxides may also be used.

The reaction medium is preferably an alcohol such as methanol or other alcohol, although any nonpolar diluent in which the fluorodinitromethide is relatively insoluble and which is inert to the reaction may be used. For instance, hydrocarbon solvents and chlorocarbons such as chloroform, carbon tetrachloride and methylene chloride are also useful.

The action of the strong base on the halodinitroethyl alcohol produces a suspension of the insoluble salt, potassium halodinitromethide and formaldehyde. Upon separation of the salt from the formaldehyde, the free halodinitromethane is generated by treatment of the salt with an acid such as sulfuric acid. Other acids which may be used in lieu of sulfuric acid are hydrochloric acid or, in fact, any strong mineral acid.

REACTANT CONCENTRATIONS

The ratios of the various reactants are not critical, it merely being necessary that the stoichiometric amount of base necessary for deformylation be added to the halodinitroethanol and that there be sufficient diluent present to dissolve the base. In practice, an excess of base is added to the alcohol to insure complete reaction.

Similarly, an excess of acid over that necessary to convert the salt to free halodinitromethane is used.

REACTION CONDITIONS

Because of the instability of potassium halodinitromethide under ambient conditions, the temperature of the reaction must be kept below about 5° C. in order to prevent decomposition of the salt. The preferred temperature for reaction is about 0° C. although any temperature below about 5° C. is within the scope of the invention. At lower temperatures, of course, the rate of reaction will accordingly decrease.

PROCESS STEPS

As stated supra, addition of the strong base to the appropriate halodinitroethyl alcohol will produce an insoluble salt, potassium halodinitromethide and formaldehyde. In order to recover the salt it must be separated from the formaldehyde, but there are problems associated with the recovery of potassium dinitromethide because of its instability under ambient conditions. The potassium halodinitromethide cannot be safely separated from the reaction mixture by simple filtration since it will detonate on the filter as soon as it dries.

It is therefore necessary to isolate the potassium salt by low-temperature filtration. This may be done by diluting the reaction medium with cold methylene chloride immediately prior to filtration. The filter cake obtained may then be washed in cold methylene chloride and air dried. The product so obtained may then be kept on the cold funnel for several hours without decomposing.

An alternative to the above-described isolation procedure is to bypass the isolation of the potassium salt by pouring the initial reaction mixture, containing the potassium halodinitromethide salt, methanol and formaldehyde, into ice-cold sulfuric acid and extracting with methylene chloride. This method has the advantage of simplicity but yields are lower than that obtained by the initial technique.

Upon recovery of the potassium salt, the free halodinitromethane is generated by treating with sulfuric acid.

The following example illustrates a specific embodiment of this invention but is not to be construed as a limitation of the scope thereof.

Example

To a well stirred solution of 12.5 g. of potassium hydroxide in 50 ml. of methanol there was added, at 0° C. and over a 15 minute period, 25 g. of fluorodinitroethanol dissolved in 50 ml. of methanol. During this addition, about 50 ml. of cold methylene chloride was added in order to keep the mixture stirrable.

The reaction mixture is then filtered at a low temperature by adding 50 ml. of cold methylene chloride prior to filtration and keeping the funnel immersed in a Dry Ice-acetone bath during filtration.

The yellow potassium fluorodinitromethide (which explodes violently if allowed to warm up) was then washed again with precooled methylene chloride and converted to the free fluorodinitromethane by washing with 100 ml. of cold sulfuric acid. There was obtained 14.5 g. (72% of theoretical) of fluorodinitromethane having a purity greated than 99.5 mole percent and a B.P. of 125° C.

Similarly, chlorodinitromethane, and bromodinitromethane may be prepared by using chlorodinitroethanol and bromodimitroethanol in lieu of the fluorodinitroethanol used in the example.

The halodinitromethanes in general, and fluorodinitromethane in particular, are useful as synthetic intermediates in the preparation of organic high explosives, characterized by the presence of a terminal fluorodinitromethyl group, which have recently been developed. For instance, the addition of fluorodinitromethane to a dialdehyde such as glyoxal yields difluorotetranitroalkanediols such as 1,4-difluoro-1,1,4,4-tetranitrobutanediol-2,3.

Obviously many modifications and variations of the present invention are possible in the light of the above teachings. It is therefore to be understood that within the scope of the appended claims, the invention may be practiced otherwise than as specifically described.

Accordingly, what is claimed and desired to be secured by Letters Patent of the United States of America is:

1. Fluorodinitromethane.
2. The method of preparing a halodinitromethane which comprises intimately contacting a halodinitroethanol with a strong base, separating a halodinitromethide salt from the reaction medium and treating said salt with a strong mineral acid to generate free halodinitromethane.
3. The method of claim 2 wherein the halodinitroethanol is fluorodinitroethanol.
4. The method of claim 2 wherein the base is potassium hydroxide.
5. The method of claim 2 wherein the mineral acid is sulfuric acid.
6. The method of clami 2 wherein the reaction temperature is below about 5° C.
7. The method of claim 2 wherein the base is dissolved in an inert diluent.
8. The method of claim 7 wherein said diluent is an alcohol.
9. The method of preparing a halodinitromethane which comprises intimately contacting a halodinitroethanol with a strong base and directly adding the reaction medium to a strong mineral acid.

References Cited

Zeldin et al.: J. Am. Chem. Soc., vol. 79, 1957, pp. 4708–4720.

Harper et al.: J. Chem. Soc., vol. 107, p. 91 (1915).

Gotts et al.: J. Chem. Soc., vol. 125, pp. 442–450 (1924)

Schmidt et al.: J. Org. Chem., vol. 9, pp. 419–423 (1944).

LELAND A. SEBASTIAN, *Primary Examiner.*

U.S. Cl. X.R.

149—88